(12) United States Patent
Slaymaker

(10) Patent No.: US 6,572,687 B2
(45) Date of Patent: Jun. 3, 2003

(54) GAS DRYER

(75) Inventor: Reg Slaymaker, Edmonton (CA)

(73) Assignees: Clearwater International LLC, Houston, TX (US); Argo Sales Ltd., Nisku (CA)

(*) Notice: Subject to any disclaimer, the term of this patent is extended or adjusted under 35 U.S.C. 154(b) by 0 days.

(21) Appl. No.: 09/915,005

(22) Filed: Jul. 25, 2001

(65) Prior Publication Data

US 2003/0019358 A1 Jan. 30, 2003

(51) Int. Cl.[7] ............................................. B01D 53/26
(52) U.S. Cl. ........................ 96/119; 96/131; 55/442; 55/462; 34/80
(58) Field of Search ................. 75/117, 267; 96/119, 96/120, 121, 131, 134, 139, 152, 396; 55/442, 462, DIG. 25; 34/80

(56) References Cited

U.S. PATENT DOCUMENTS

| | | | |
|---|---|---|---|
| 913,325 A | * | 2/1909 | Touzimsky ................. 96/119 |
| 1,096,224 A | * | 5/1914 | Cochran ..................... 55/323 |
| 2,804,940 A | | 7/1957 | Hutchinson |
| 3,170,776 A | * | 2/1965 | Knight et al. .............. 202/158 |
| 3,246,453 A | * | 4/1966 | Becker |
| 3,312,041 A | * | 4/1967 | Hill |
| 3,589,105 A | * | 6/1971 | Becker et al. ................ 96/120 |
| 3,653,181 A | * | 4/1972 | Becker ......................... 95/91 |
| 4,433,983 A | * | 2/1984 | Hodgson et al. ......... 261/114.1 |
| 4,755,194 A | * | 7/1988 | Rooker et al. .............. 95/258 |
| 5,512,088 A | * | 4/1996 | McKenzie ................... 55/518 |
| 5,733,841 A | | 3/1998 | Thomas |
| 5,766,309 A | | 6/1998 | Thomas |
| 5,882,383 A | | 3/1999 | Dingfelder |
| 5,961,698 A | * | 10/1999 | Dossaji et al. ................ 34/80 |
| 6,119,711 A | | 9/2000 | Dougherty |

* cited by examiner

Primary Examiner—Duane Smith
Assistant Examiner—Frank M. Lawrence
(74) Attorney, Agent, or Firm—William L. Krayer

(57) ABSTRACT

A gas dryer particularly useful for natural gas transmission lines has a sump vessel including a splash plate for intercepting incoming gas, a lower region for collecting water removed from the gas, at least one tower or other vessel for holding desiccant tablets and permitting water to drain into the sump, and partition(s) in the vessel extending into the lower region to permit collected sump water to be in a single body of liquid while the partitions in the upper regions of the vessel direct the gas from one tower or drying vessel to another.

5 Claims, 2 Drawing Sheets

GAS DRYER

TECHNICAL FIELD

This invention relates to gas dryers for use in gas transmission lines and in other contexts where gas is to be dried.

BACKGROUND OF THE INVENTION

Various types of vessels have been used in the past for drying natural gas in gas transmission lines. See, for example, the illustrations in Thomas U.S. Pat. No. 5,766,309 and Dingfelder U.S. Pat. No. 5,882,383.

A problem with gas dryers left on gas transmission lines in remote areas has been that they must be serviced frequently to check on the desiccant solutions that are formed from the desiccant and the moisture in the gas, and simply to replace the desiccant tablets or other materials. The capacity for drying in prior art vessels is limited by the design of the dryer, the limits on the amount of desiccant that can be used, and the manner of handling the solution formed from the desiccant material and moisture captured from the gas. Because of these limitations, frequent service calls must be made to replenish the desiccant and to make sure the sump solution does not foul the dryer.

My dryer requires a minimum of service.

SUMMARY OF THE INVENTION

I have invented a gas dryer that is able to process large quantities of gas and remove large quantities of moisture before it must be serviced. The dryer comprises a sump vessel having an inlet for gas from a gas line, a splash plate positioned in the sump vessel so that gas from the inlet will strike the splash plate, at least one drying vessel communicating with the sump vessel for retaining a bed of desiccant solids and an exit for the gas after said gas passes through the drying vessel.

While the inlet may lead from any gas line, my invention is especially useful in gas transmission lines.

DETAILED DESCRIPTION OF THE INVENTION

Figure 1:
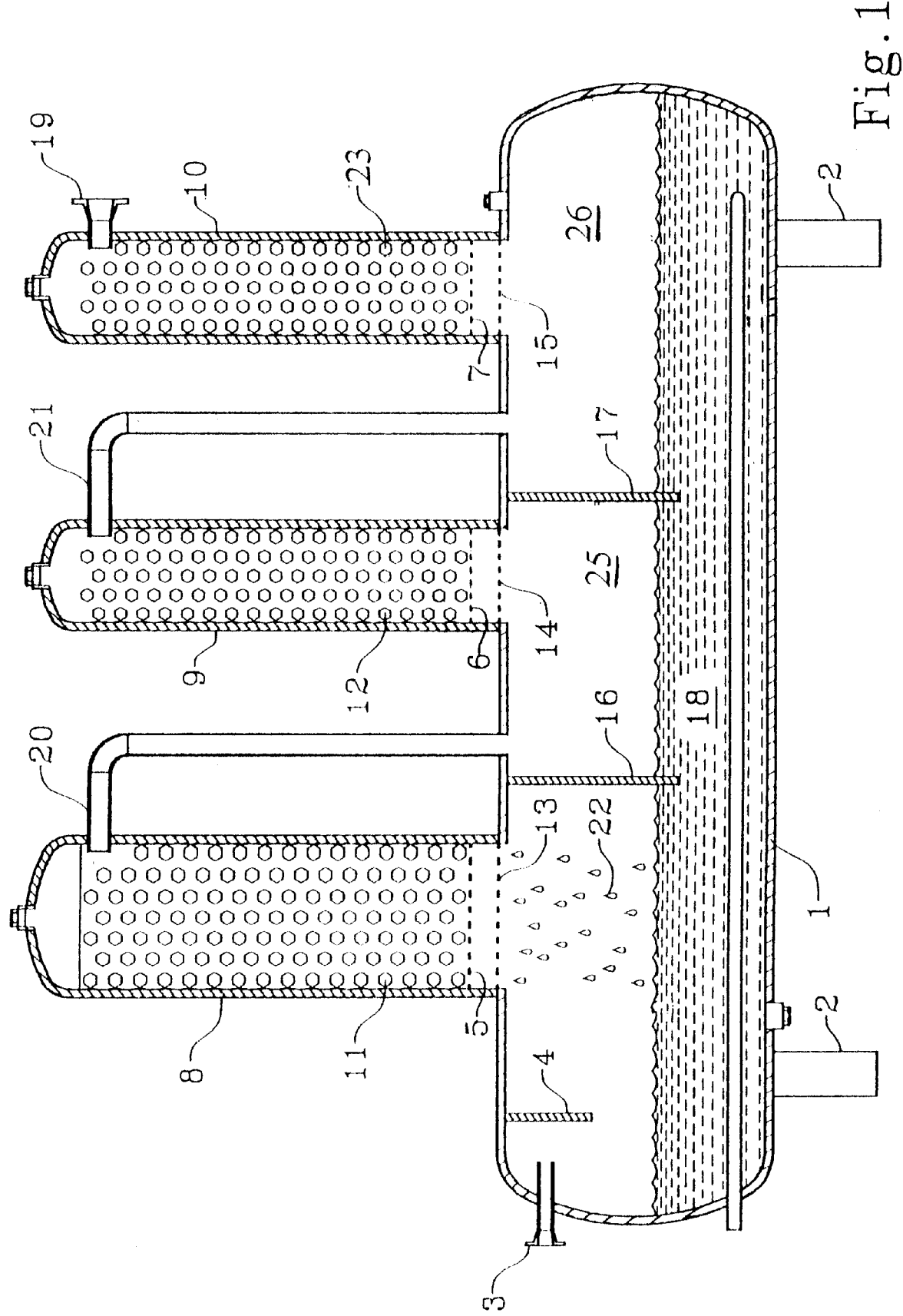
FIG. 1 is a side sectional view of a preferred configuration of my dryer.

Referring now to FIG. 1, the sump vessel 1 is preferably an elongated tank which may stand on legs 2. Vessel 1 has a gas inlet 3, and splash plate 4 is positioned directly in the path of gas entering the vessel 1 from a gas transmission line not shown but connected to inlet 3. Droplets of water in the gas strike splash plate 4 and drain from it to fall into sump liquid 18, collected in the bottom of sump vessel 1. Separation plate 16, extending low enough to be immersed in sump liquid 18, prevents the passage of gas beyond separation plate 16, and accordingly gas proceeds upwards through perforated plate 5 into tower 8. Perforated plate 5 holds a bed of desiccant tablets 11, which acts to remove more moisture from the gas. Gas exits tower 8 through pipe 20, leading to chamber 25, having an outlet 14 leading to perforated plate 6, which holds another bed of desiccant tablets 12 in tower 9. A second separation plate 17 defines a chamber 26. Gas passing through the tower 9 exits through pipe 21 and finds chamber 26, having an outlet 15 leading the gas to perforated plate 7, which holds yet another bed of desiccant tablets 23 in tower 10. At the top of tower 10 is an outlet 19 for the gas connected to a transmission line not shown.

It will be recognized that there is a common sump for all three towers 8, 9, and 10, and that the gas is caused to flow through the three towers serially by reason of the separation plates 16 and 17 which are immersed in the sump liquid 18. This is further illustrated in FIG. 2.

Figure 2:
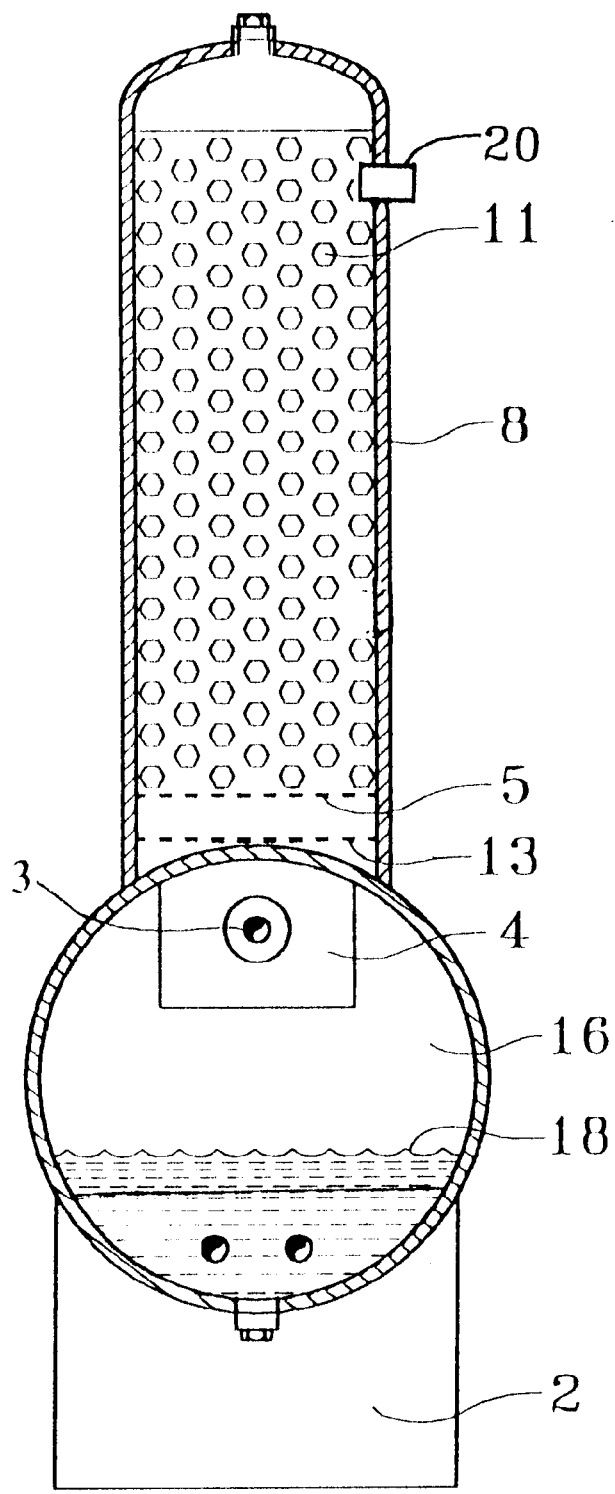
FIG. 2 is an end section showing the drying vessel with a drying tower.

The end section of FIG. 2 is taken through tower 8 so that separator plate 16 is seen. However, splash plate 4 is also illustrated; it is seen to be positioned directly in the path of gas entering through inlet 3. An optional second perforated plate 13 is positioned below perforated plate 5. Optional perforated plate 13 may be used to help assure the even distribution of the gas through the bed of desiccant tablets 11; that is, the upwardly flowing gas must pass through the perforations of plate 13 as well as perforated plate 5, which supports the bed of tablets 11. Referring again to FIG. 1, outlets 14 and 15 may accommodate optional second perforated plates in the same manner as optional perforated plate 13.

In operation, gas entering through inlet 3 first strikes splash plate 4, which releases liquid from it, almost entirely small liquid drops of water. This water falls into sump liquid 18. The gas then proceeds upwardly through optional perforated plate 13 and perforated plate 5, passing into the bed of desiccant tablets 11. Here, additional moisture is removed from the gas, forming a solution of desiccant and water, which falls as drops 22 into the sump liquid 18. Generally, as is known in the art, the solution of desiccant salts and water is more plentiful near the bottom of tower 8, but the perforations in perforated plate 5 serve both to permit downward drainage and at the same time permit upward distribution of the gas into the bed with a minimum of channeling. The desiccant tablets 11 will be consumed in due course, and must be replenished. However, it should be noted that the volume of tower 8 is greater than each of towers 9 and 10. Preferably the volume of tower 8 is from 1.5 to 3 times the volume of each of towers 9 and 10, but the volume of tower 8 may range from 1.2 to about 4 times that of either tower 9 or 10. Moisture is also released and drained in the form of droplets similar to droplets 22, from towers 9 and 10, and the desiccant tablets 12 and 23 must also be replenished in due course. The use of sequential towers achieves a very dry gas. The operator may determine through experience that certain quantities of desiccant in towers 8, 9, and 10 may be calculated so that they may all be consumed and replenished at about the same time. Factors such as the origin of the gas, its velocity and/or flow rate, moisture content, and temperature may affect the calculation result. It is beneficial to use relatively inexpensive desiccant salts in the first tower 8, where most of the moisture is removed, and the other towers can be loaded with perhaps more expensive but more efficient desiccant tablets chosen to remove the remnants of the moisture.

Splash plate 4 need not be a flat plate, but can be any shape which will collect droplets impacted on it by the moving gas. For example, the splash plate 4 could be conical or bent to cause the droplets to coalesce.

Sump liquid 18 may be continuously or intermittently drained by a conventional level control (any commercially available level controller), a timer, or manually, or may be pumped out also on command of a timer or level control, or manual switch. Maintaining a more or less constant level above the lower terminus of separation plates 16 and 17 will assure a steady state performance of the dryer. However, while gas is passing through for drying, if the level of liquid 18 drops below the lower terminus of separation plates 16 and 17, the most efficient operation of the drier will not be achieved.

What is claimed is:

1. Apparatus for drying gas comprising a sump vessel including a gas entrance chamber, at least one central chamber, and a terminal chamber, said chambers being defined by partitions in an upper portion of said sump vessel and extending into a lower portion of said sump vessel but providing a common sump volume in said lower portion, said gas entrance chamber having a tower above it for holding a bed of desiccant tablets, draining liquid therefrom, and guiding gas through said bed of desiccant tablets to said central chamber, said central chamber having a tower above it for holding a bed of desiccant tablets, draining liquid therefrom, and guiding gas through said bed of desiccant tablets to said terminal chamber, said terminal chamber having a tower above it for holding a bed of desiccant tablets, draining liquid therefrom, and guiding said gas to an exit, said partitions having termini extending into said lower portion of said sump vessel to assure the flow of gas sequentially through said towers when sump liquid is at a level above said partition termini, said gas entrance chamber including a splash plate situated directly in the path of gas entering said gas entrance chamber.

2. Apparatus of claim 1 wherein said tower above said gas entrance chamber is capable of holding a larger bed of desiccant tablets than said other towers.

3. Apparatus of claim 1 including a level controller for controlling the level of liquid in said sump vessel.

4. Apparatus of claim 1 including beds of desiccant tablets in said towers.

5. Apparatus of claim 1 including liquid in said lower portion of said sump vessel having a level higher than the termini of said partitions.

* * * * *